(12) United States Patent
Engelmann et al.

(10) Patent No.: US 9,267,603 B2
(45) Date of Patent: Feb. 23, 2016

(54) IN LINE MILL ASSEMBLY WITH LABYRINTH SEAL

(75) Inventors: Dennis Engelmann, Germantown, WI (US); Robert LeDain, Fox Lake, IL (US); Sean Merlo, Libertyville, IL (US)

(73) Assignee: UCC Dry Sorbent Injection, LLC, Waukegan, IL (US)

( * ) Notice: Subject to any disclaimer, the term of this patent is extended or adjusted under 35 U.S.C. 154(b) by 560 days.

(21) Appl. No.: 13/598,157

(22) Filed: Aug. 29, 2012

(65) Prior Publication Data

US 2014/0061341 A1    Mar. 6, 2014

(51) Int. Cl.
*F16J 15/40* (2006.01)
*F16J 15/447* (2006.01)
*B02C 13/26* (2006.01)

(52) U.S. Cl.
CPC ............. *F16J 15/4472* (2013.01); *B02C 13/26* (2013.01); *Y10T 137/0396* (2015.04)

(58) Field of Classification Search
CPC .... F16J 15/447; F16J 15/4472; F16J 15/4474
USPC .................. 277/409, 411, 412, 413, 416, 421
See application file for complete search history.

(56) References Cited

U.S. PATENT DOCUMENTS

| 5,794,942 | A  | * | 8/1998 | Vance et al. | 277/303 |
| 6,367,806 | B1 | * | 4/2002 | Turnquist et al. | 277/355 |
| 7,559,554 | B2 | * | 7/2009 | Hogg et al. | 277/412 |
| 2010/0158674 | A1 | * | 6/2010 | Turnquist et al. | 415/173.1 |

* cited by examiner

*Primary Examiner* — Gilbert Lee
(74) *Attorney, Agent, or Firm* — Niro, Haller & Niro

(57) ABSTRACT

The system and method for preventing air leakage from the process side to the bearing side of a mill. The system includes a labyrinth seal ring comprising a series of knives defining first and second labyrinth paths from an air inlet to the process side and the bearing side of the system, respectively. The differences in the two paths such as provided by the number of knives used in each path creates a differential pressure drop which biases air from the air inlet to the process side. The labyrinth seal thus provides a reliable and superior method for reducing the potential for particulate in the process side of the mill from damaging the bearing system.

8 Claims, 5 Drawing Sheets

IN LINE MILL ASSEMBLY WITH LABYRINTH SEAL

FIELD OF INVENTION

The present invention relates to a system and method for reducing particulate wear on the bearing components of an in-line mill. Specifically, the present invention relates to a bearing seal ring for providing air paths from an inlet to the process side and the bearing side, respectively, of an in-line mill. Preferably, the ring includes a series of knives which act as impediments such that the paths thus created are labyrinth paths. The inlet further is preferably extending from an air port located on an axial location of the ring such that the number of knives or barriers between the inlet and the bearing side is greater than the number of knives or barriers between the air inlet and the process side. Providing air through the air inlet in this configuration creates a pressure bias such that the air is biased towards the process side. Thus, a system and method for preventing process fluid from leaking into and damaging the bearing assembly is disclosed.

BACKGROUND OF THE INVENTION

With the increase in environmental oversight, operators of power plants are pushing to discover new and better ways to remediate potential pollutants which are the byproducts of the power generation process. A variety of approaches have been developed for removal or mitigation of such byproducts resulting from coal fired power plants. One known approach is the use of dry sorbent injection (DSI) systems to reduce acid gas levels, such as such as sulfur dioxide (SO2), sulfur trioxide (SO3), sulfuric acid (H2SO4), and hydrochloric acid (HCl). DSI involves the addition of an alkaline material (such as sodium bicarbonate, hydrated lime, or trona) into various locations of the power plant system such that the acid gases react with the alkaline sorbents to form solid salts which are removed via a particulate control device.

While DSI is a cost effective control solution, it is not without its own processing challenges. For instance, certain sorbent materials are prone to clumping or agglomerization, while some sorbent materials (e.g., trona) are known to require milling in order to increase the surface area for absorption and to be more cost effective. For a variety of reasons (e.g., superior flow properties and predictability of particulate size), the use of on-site milling for certain sorbent particulate is preferred.

One particularly effective method of on-site milling is the use of an in-line mill using a pneumatic transport or conveying system, which provides a superior reduction of SO3 stack emissions when injecting trona. This approach, however, typically requires the use of a bearing assembly to support and facilitate the milling process. The use of a bearing assembly, in turn, creates problems in that the bearing assembly requires oil or similar lubricant for operation, but the nature of the in-line mill requires an operational clearance between the bearing assembly casing and the running surface (i.e., such that the shaft or similar moving components can rotate). Thus, the use of such milling system requires a bearing seal such that the lubricant is kept apart from the fluid of the milling area (and vice versa). A wide variety of seals are known for such processes.

One class of bearing seals are contacting seals, such a lip seal or more complex designs as in the case of a face/mechanical seal. Contacting bearing protectors such as lip seals often require lubrication at the contact points of rotational surfaces. In high shaft rotational speed applications, excessive heat can be created in absence of sufficient lubrication. Such a lubrication requirement can make this approach unacceptable for a milling system which requires high speed rotation of the shaft assembly.

By contrast, non-contacting bearing protectors can be of repeller or labyrinth configuration. A labyrinth seal may be composed of many grooves or knives so that the fluid has to pass through a long and difficult path to escape between the operating surfaces. Sometimes such knives exist on the outer and inner portion of the mating surface. These knives or grooves produce long characteristic path and pressure resistance which slows leakage. For labyrinth seals on a rotating shaft, a very small clearance must exist between the knife tips of the labyrinth and the running surface.

Unfortunately, in milling applications which require the processing of particulate in a pressurized fluid, the particulate often penetrates the close rotating clearances of conventional labyrinth seal technology, leading to blockage and rotational seizure. An air purge system can be used to overcome particulate entry, but skepticism has developed around the effectiveness of such an approach, since while some of the air acts to blow away the powder from the bearing seal entry point, air is also directed into the bearing chamber. The consistent injection of pressurized fluid or air proximate to the seal can force particulate and similar contaminants into the oil or other lubricant-based environment supporting the bearing assembly. Such an outcome can result in undue wear or premature replacement of the bearing assembly and/or replacement or failure of the mill, with the consequential degrading of the efficacy of the contaminant remediation process.

In other words, an in-line mill system needs to have a seal which minimizes or precludes leakage of pressurized fluid into the lubricant chamber of the bearing assembly, while at the same time preventing an excessive fluid or air pressure from the process side forcing particulate into the bearing assembly.

Thus, the present state of the art reflects a need for a system which reliably mills entrained particulate entrained in a pressurized fluid (such as sorbent particulate in a pneumatic conveyance system) in an in-line mill configuration without creating undue wear or buildup in the bearing assembly, as such wear may increase maintenance costs and failure risks and decrease the efficiency of the system.

DESCRIPTION OF THE PRIOR ART

One example of a prior art approach is found in U.S. Pat. No. 7,857,321 B2 (Roddis), the teachings of which are incorporated herein by reference. That invention teaches a bearing seal device that has an air purge mechanism. Roddis specifically teaches the use of an air purge mechanism with a self-compensating air supply regulator device such as a deformable toroid (e.g., an O-ring) which creates a contacting seal between the rotor and stator of the system. Such an approach, however, requires the addition of components, such as an O-ring, to provide the requisite operational clearance between components of the system. Such an arrangement, by definition, will wear down over time and require replacement, which may not be practical for power plant configurations. In short, while providing an improved system over the prior art, Roddis fails to suggest or teach how to provide an air supply for a non-contacting seal without requiring the addition of further components which are deformable and create additional issues of wear and failure.

What is needed is simple, cost effective and durable solution for maintaining the fluid integrity of a bearing assembly for an in-line mill processing a particle laden pressurized fluid.

DEFINITION OF TERMS

The following terms are used in the claims of the patent as filed and are intended to have their broadest plain and ordinary meaning consistent with the requirements of the law.

An "in-line mill" means an in situ rotary tool for cutting, grinding or otherwise reducing particulate components which are located within a pressurized fluid stream.

"Knives" means the blades, barriers or similar structures which create one or more labyrinth paths formed upon at least the inner circumference of the seal ring in order to impede fluid traversing from the bearing assembly side to the particulate processing side (or vice versa) in an line mill system.

An "air port" means an aperture or path for introducing pressurized air from the outside of a seal ring into operational clearance are between the inner surface of the seal ring and the shaft of the in-line mill.

A "shaft and bearing assembly" refers to a support structure which is attached to (whether being integral to or connected to) a casing which supports a rotor of an in-line mill.

A "drive assembly" refers to a subsystem which provides force such that the rotors can cut, grind or reduce particulate from the fluid stream.

Where alternative meanings are possible, the broadest meaning is intended. All words used in the claims set forth below are intended to be used in the normal, customary usage of grammar and the English language.

OBJECTS AND SUMMARY OF THE INVENTION

The apparatus and method of the present invention generally includes an in-line mill system employing a seal ring for impeding fluid leakage to or from a bearing assembly. The seal ring includes one or more apertures or air ports which is generally open at points around the interior circumference of the seal ring so as to provide paths for pressurize air to be placed into the spacing between the seal ring and the shaft assembly. The ring further includes a plurality of knives defined around the interior circumference of the ring and displaced along the axial length of the ring so as to define labyrinth paths in the interior circumference of the ring and thus to make a barrier for resisting the leakage of fluids between the milling space and the bearing assembly. In particular, the knives of the present invention are configured such that a greater number of knives are located along the axial length of the ring between the air ports and the bearing assembly than the number of knives between the air ports and the process or milling side. These knife sets create first and second labyrinth paths, respectively, between the air port and the process area and between the air port and the bearing assembly. Thus, as pressurized air is introduced through the air ports, delivery of the air is biased towards the process or milling side, instead of the bearing assembly because of the difference in pressure drops between the first and second labyrinth paths. This air bias provides a means to prevent accumulation of particulate between the seal ring and the shaft, while decreasing the likelihood of contaminating the lubricant or similar fluid in the bearing assembly. The seal is typically supported by a carrier ring, which in turn is typically connected to the bearing assembly.

The immediate application of a present invention will be seen in processing sorbent and similar particulate for pollution control from operating plants, though those of skill will see that the present invention could be applied to other fields requiring a simple and robust solution for in-line mill systems processing particulate in systems which require a sealed bearing assembly.

Thus can be seen that one object of the present invention is to provide a cost effective system for reducing build up and wear of in-line mills which process particulate entrained in a fluid stream.

A further object of the present invention is to provide a system and method for reducing wear and build up on bearing assembly components of an in-line mill processing particulate laden fluid streams.

Still another object of the present invention is to provide a non-contacting seal which effectively prevents or reduces particulate build up from the operating space between the seal and the shaft.

Yet another object of the present invention is to provide an air stream through a non-contacting seal so as to prevent particulate buildup in the seal space without creating an undue risk of introducing further contaminants into the bearing assembly.

Still another object of the present invention is to provide a system and method for a superior non-contacting seal in connection with processing particulate laden fluid streams which does not introduce or require deformable components which could create problems of undue component wear.

It should be noted that not every embodiment of the claimed invention will accomplish each of the objects of the invention set forth above. In addition, further objects of the invention will become apparent based the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
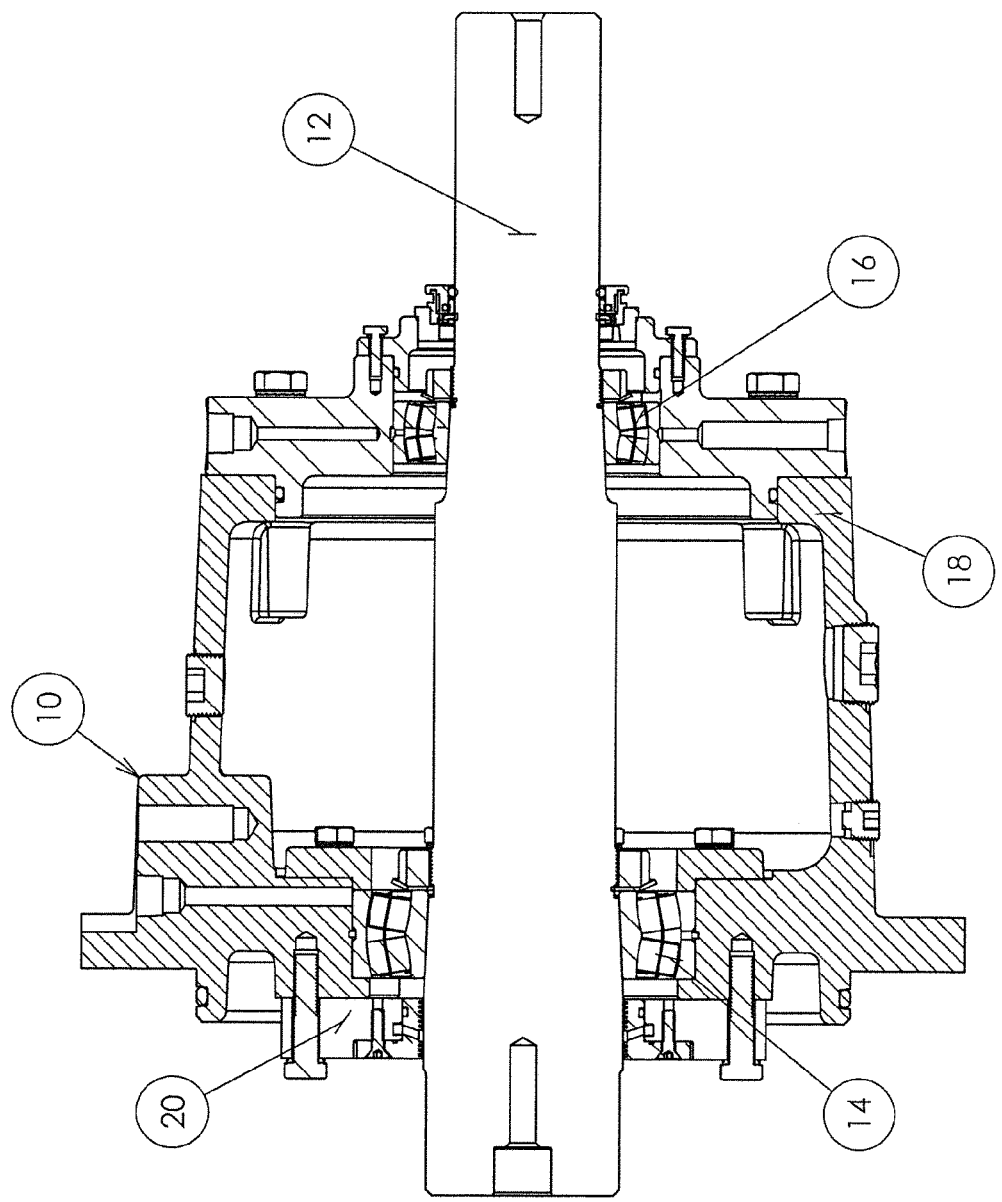
FIG. 1 shows an exposed side view of a bearing assembly using a seal ring in accord with an embodiment of the present invention.
Figure 4:
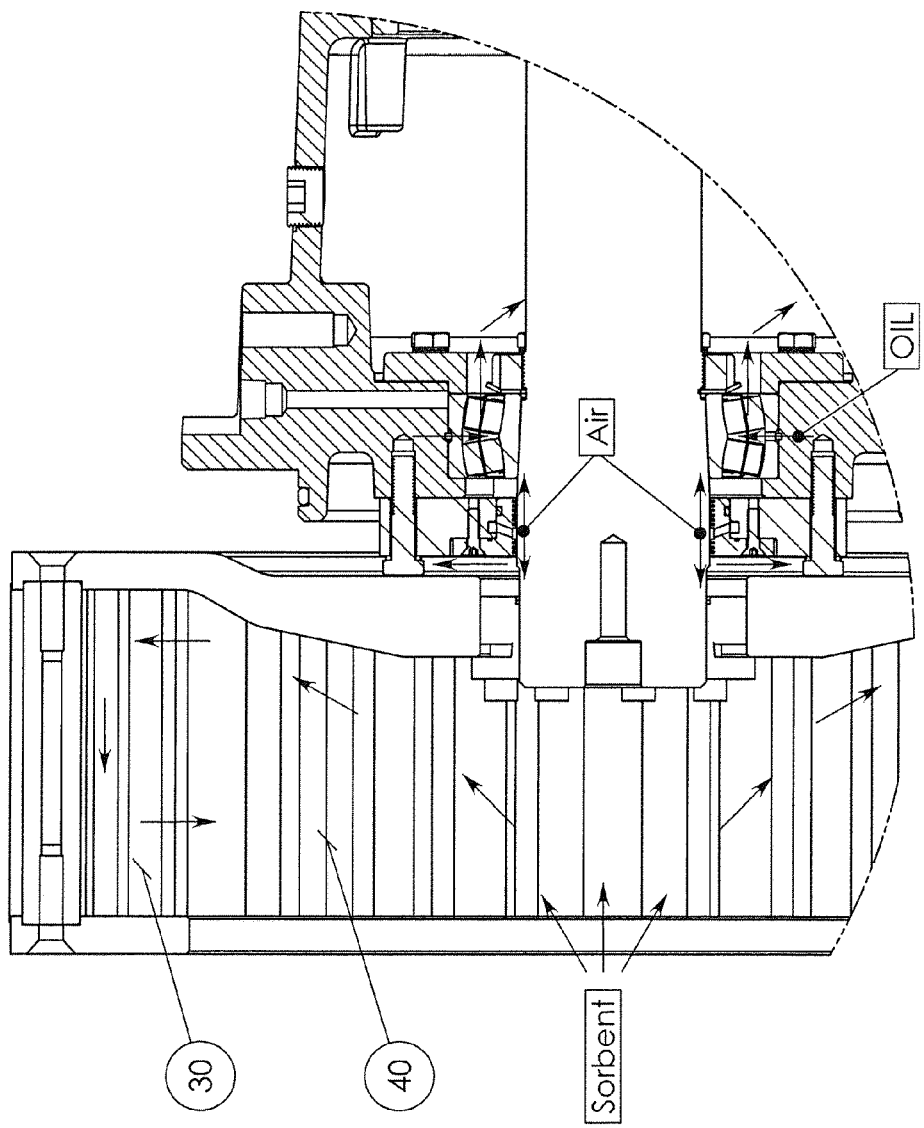
FIG. 4 is an exposed side view of the in-line mill components including the bearing assembly with the seal ring operating in conjunction with the rotor and stator components of the system.

FIG. 1 shows a first preferred embodiment of a bearing assembly 10 constructed in accordance with the present invention. The bearing assembly 10 includes a bearing shaft 12 or shaft and sets of inner bearings 14 and outer bearings 16, with the inner bearings being closest to the processing side (not shown in this figure). In this first preferred embodiment, the inner bearing 14 and outer bearings 16 are preferably spherical roller bearings, though persons of ordinary skill will understand that other bearings, either in terms of types or number of bearings, may be used instead. The bearing assembly 10 further includes a casing 18 or housing for containing the bearings, as well as oil or other suitable lubricant for supporting the operation of the bearing assembly components. Connected to the casing 18 on the processing side of the bearing assembly 10 is a labyrinth seal subassembly 20 discussed in further detail below. As shown in FIG. 4, the milling itself is provided by means of a rotor blades 30 surrounded by a concentric and closely operating cutter block 40 such as disposed within a stator. One example of the milling components of such system is found presently in the discussion of the applicant's VIPER Mill™, as disclosed at http://unitedconveyor.com/uploadedFiles/Systems/Dry_Sorbent_Injection/Viper%20Mill %20Datasheet.pdf, and the teaching of that disclosure is incorporated herein by reference.

Figure 2:
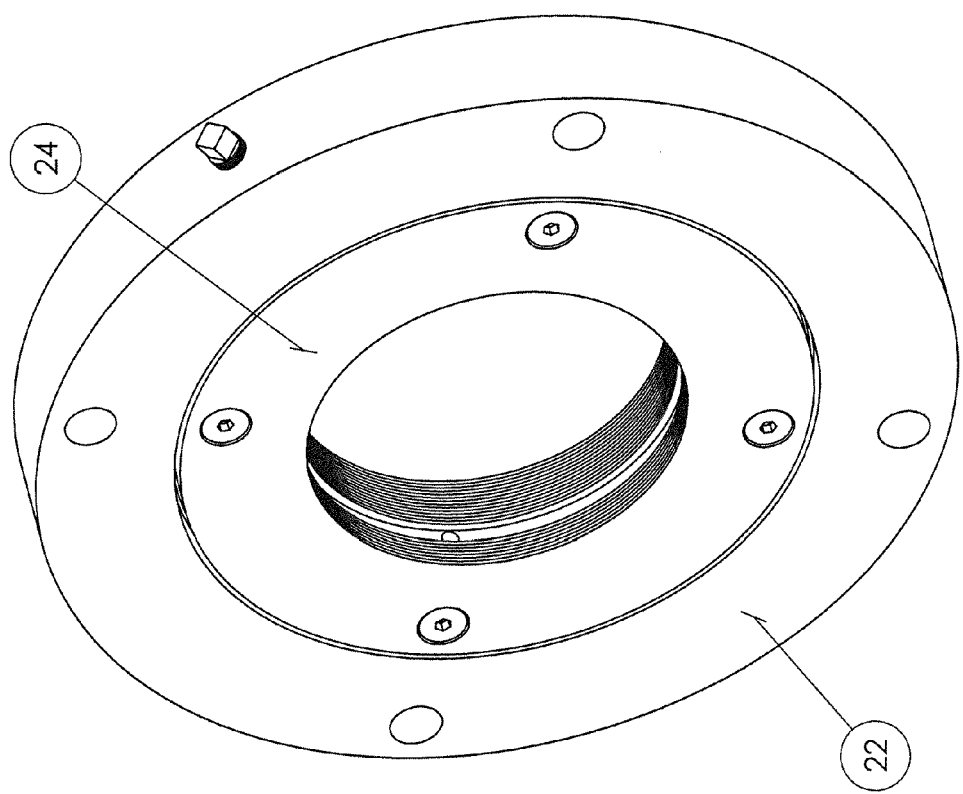
FIG. 2 shows a perspective view of a seal ring mated with a carrier ring according to an embodiment of the present invention.
Figure 3:
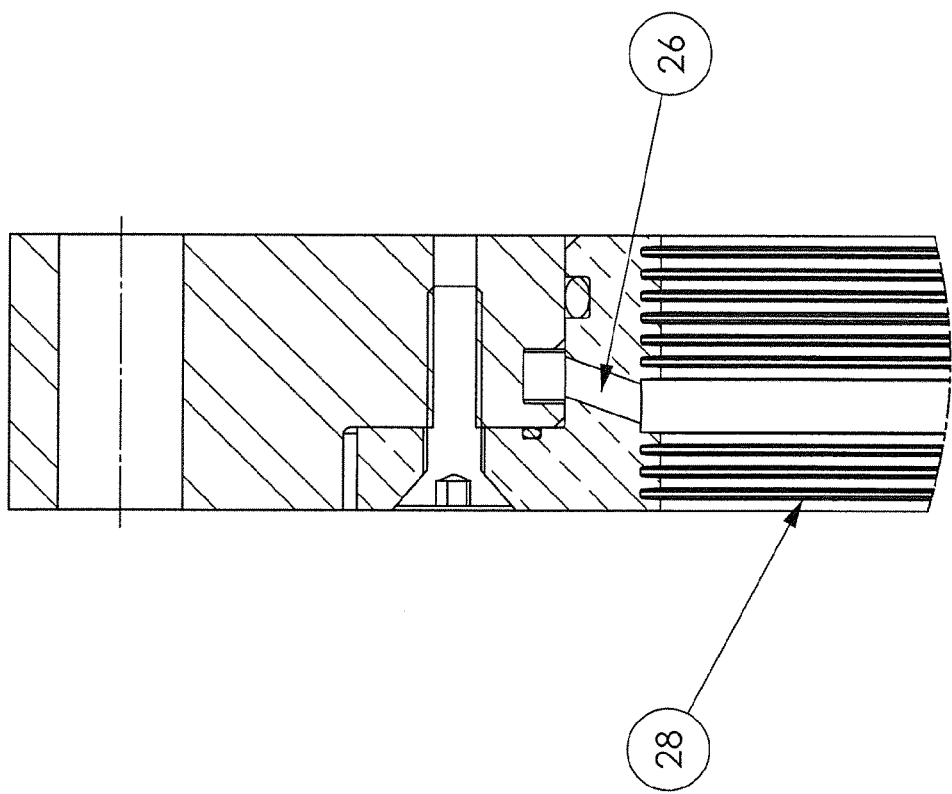
FIG. 3 shows details of the air part and knives of the seal ring of an embodiment of the present invention.

As shown in FIGS. 2 and 3, the labyrinth seal subassembly 20 of a first embodiment of the present is shown. The labyrinth seal 20 in this embodiment comprises a carrier 22 which is preferably bolted to the casing 18 (not shown) and a seal ring 24 or insert seated therein. The interior circumference of the seal ring 24 defines an aperture for surrounding and mating with the bearing shaft 12. The face of the carrier 22 has airports 26 or apertures defined therethrough. The air ports extend through the interior circumference of the carrier 22 and through the seal ring 24 such that the airport 26 terminates at a point on the interior circumference of the seal ring. The interior circumference surface of the seal ring 24 further includes a series of labyrinth knives 28. The labyrinth knives 28 define a pair of labyrinth paths, extending in each direction from the airport 26, with one path extending to the processing or milling side and the other towards the bearing assembly 10.

As shown in FIG. 3 a key feature of the preferred embodiment of the present invention is the uneven distribution of labyrinth knives 28 relative to the air port 26. That is, the teachings of the invention call for a greater number of labyrinth knives 28 between the air port 26 and the bearing assembly than the number of knives between the air port and the process area. In a first preferred embodiment, the knives 28 are milled or otherwise integrally formed within the interior circumference surface of the seal ring 24, though those of skill in the art will understand that alternative embodiments may include knives which are not integral to the seal ring without department from the scope and spirit of the claimed invention.

A side view of the mill system of this first embodiment of the present invention showing the through flow path of each of the relevant fluids, i.e., a particulate laden fluid stream, an air port air stream, and an oil or lubricant fluid stream is shown in FIG. 4. In this view, a particulate (e.g., sorbent) laden fluid enters the milling or processing area comprising rotor blades 30 and cutter blocks 40. As the flow of such sorbent laden fluid is at least partly generally parallel to the bearing shaft 12, there exists the possibility that such sorbent could be lodged in the small space between bearing shaft 12 and seal ring 24, and eventually contaminate the oil housed within the casing 18. Thus, the present invention provides for an air stream to be injected into the air ports 26. The knives 28, as described above, are unevenly spaced, with a lesser number of knives 28 disposed between the air port 26 and the operational space components such as the rotor blades 30 and other milling components (such knives defining a first labyrinth path) than the number of knives between the air port 26 and the bearing assembly 10 (such knives defining a second labyrinth path. With the differential pressure drop (i.e., a greater pressure drop for the second labyrinth path than the first labyrinth path) thus provided, the majority of the air supplied from air port 26 pushes out from air port 26 to the operational space. The air stream thus provided help to remove and prevent the accumulation of particulate in the space between the seal ring 24 and the bearing shaft 12, and thus reduces the likelihood of particulate from traversing from the processing area to the bearing assembly 10. At the same time, the lesser amount of air passing from the air port 26 to the bearing assembly reduces the likelihood of such air contaminating the lubricant of the bearing assembly, while still further slowing the leakage of such lubricant from the bearing assembly 10 through the space between the seal ring 24 and the bearing shaft 12.

Figure 5:
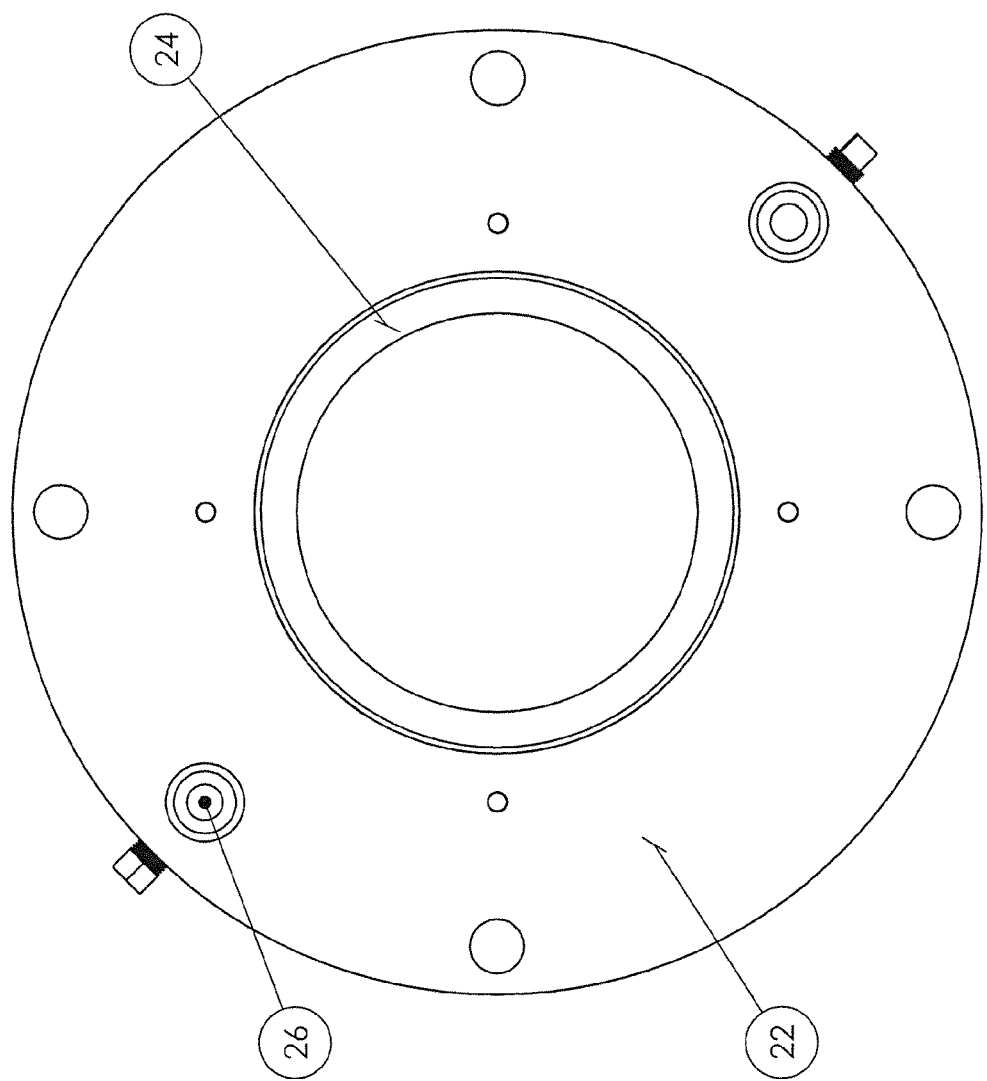
FIG. 5 is a front view of an embodiment of the present invention showing the seal ring in mating engagement with a carrier ring.

An example of the spacing of the air ports 26 in relation to one another on the carrier 22 is shown in FIG. 5. In this embodiment, the carrier 22 includes two air ports 26 which are displaced 180 degrees apart from one another. Thus, the distribution of air through such multiple air ports 26 will reduce the likelihood that a localized accumulation of particulate within the inner circumference of the seal ring 24. Those of skill will also understand that the teachings of the present invention may extend in this embodiment to further multiple air ports (e.g., 4 air ports displaced 90 degrees from on another).

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the numbers of the labyrinth knives 28 of the preferred embodiments of present invention is for illustrative purposes with reference to the example drawings only. Similarly, while some preferred embodiments of the present invention are focused upon a labyrinth path using such knives on the interior surface of the seal ring 24, those of skill will understand the applicability of the present invention to configurations whereby such knives are defined on the circumference of the bearing shaft 12 in addition to or even in lieu of the knives or blade on the seal ring 24. Likewise, it will be appreciated by those skilled in the art that various changes, additions, omissions, and modifications can be made to the illustrated embodiments without departing from the spirit of the present invention. All such modifications and changes are intended to be covered by the following claims.

What is claimed is:

1. A labyrinth seal ring for providing a process side air bias for an inline mill, said ring comprising:
   a) A plurality of knives for creating a non-contacting, brushless labyrinth seal assembly including a pressure differential between a process side and a bearing side of said in-line mill;
   b) A plurality of air ports for providing a path for an air supply to impede the flow of particulate in a pressurized fluid migrating from the process side to the bearing side;
   c) Wherein the airports are displaced around the inner circumference of the ring and axially in line with one another, and in between the plurality of knives so as to create two sets of knives, including a bearing side knife set and a process side knife set, the number of knives in the process side knife set being less than the number of knives in the bearing side knife set.

2. The ring of claim 1, wherein the plurality of air ports comprises four air ports displaced approximately ninety degrees from one another around the inner circumference.

3. The ring of claim 1 further comprising a carrier ring mating with the outer circumference of the non-contacting, brushless labyrinth seal ring, the carrier comprising at least one supply port defining a passage for supplying air to the air ports, the earner having mechanical supports for being mounted upon a bearing assembly.

4. An in-line mill for providing an improved pressurized seal for reducing the migration of particulate from the fluid being processed into a bearing assembly, the mill comprising:
   a) a rotor;
   b) a casing for enclosing the rotor, the casing including a pressurized fluid inlet, a particle reduction chamber, and a fluid outlet;
   c) a shaft and hearing assembly attached to the casing and supporting the rotor;
   d) a drive assembly operatively connected to the shaft for rotating the rotor; and
   e) a labyrinth seal ring assembly connected to the bearing assembly and proximate to the rotor for creating a brushless non-contacting seal with the rotor for providing an air flow bias towards the particle reduction chamber and away from the bearing assembly, the seal ling assembly comprising;
      i) A plurality of knives for creating a pressure differential between a process side and a bearing side of said in-line mill;
      ii) A plurality of air ports for providing a path for an air supply to impede the flow of particulate in a pressurized fluid from migrating from the process side to the bearing side;
      iii) Wherein the airports are displaced around the inner circumference of the ring and axially in line with one another, and in between the plurality of knives so as to create two sets of knives, including a bearing side knife set and a process side knife set the number of knives in the process side knife set being less than the number of knives in the bearing side knife set.

5. The in-line mill of claim 4, wherein the labyrinth seal ring assembly comprises separate brushless non-contacting seal ring and carrier components, the brushless non-contacting seal ring including the plurality of knives and air ports, and the carrier comprising at least one supply port defining a passage for supplying air to the air ports, the carrier having mechanical supports fir being mounted upon the bearing assembly.

6. The in-line mill of claim 4, wherein the plurality of air ports comprises four air ports displaced approximately ninety degrees from one another around the inner circumference of the brushless non-contacting seal ring.

7. A method for providing an air bias to inhibit particulate migration for a pressurized fluid processing chamber to a seal assembly, the method comprising the steps of:
   a) Supplying air through a plurality of ports on the interior circumference of a brushless non-contacting seal ring;
   b) Passing air form the air ports across a first labyrinth path to the pressurized fluid processing chamber;
   c) Passing air from the air polls across a second labyrinth path to the seal assembly, wherein the pressure drop across the second labyrinth path is greater than the pressure drop across the first labyrinth path, and a greater volume of supplied air traverses the first labyrinth path than the second labyrinth path and thus inhibits the leakage of particulate-laden pressurized fluid from the processing chamber to the seal assembly.

8. The method of claim 7, wherein the step of supplying to a plurality of ports requires supplying air at a greater pressure than the pressure level of the pressurized fluid.

* * * * *

UNITED STATES PATENT AND TRADEMARK OFFICE
CERTIFICATE OF CORRECTION

PATENT NO. : 9,267,603 B2
APPLICATION NO. : 13/598157
DATED : February 23, 2016
INVENTOR(S) : Dennis Engelmann, Robert LeDain and Sean Merlo Page 1 of 1

It is certified that error appears in the above-identified patent and that said Letters Patent is hereby corrected as shown below:

In the Claims:

Claim 3, Col. 7, line 10, "earner" should read --carrier--

Claim 4, Col. 7, line 19, "hearing" should read --bearing--

Claim 4, Col. 7, line 27, "ling" should read --ring--

Claim 4, Col. 8, line 2, insert a --,-- between "set" and "the"

Claim 5, Col. 8, line 12, "fir" should read --for--

Claim 7, Col. 8, line 27, "polls" should read --ports--

Signed and Sealed this
Twenty-eighth Day of June, 2016

Michelle K. Lee
*Director of the United States Patent and Trademark Office*